April 14, 1970            YASUO TAKAHASHI            3,506,336
WIDE ANGLE LENS SYSTEM
Filed Sept. 27, 1967
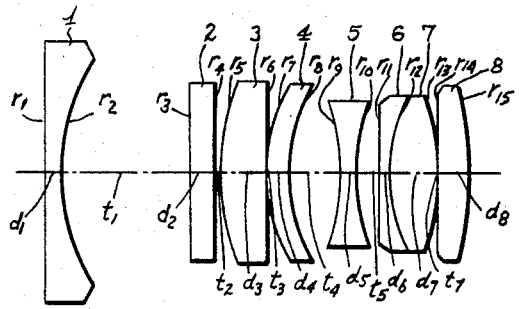
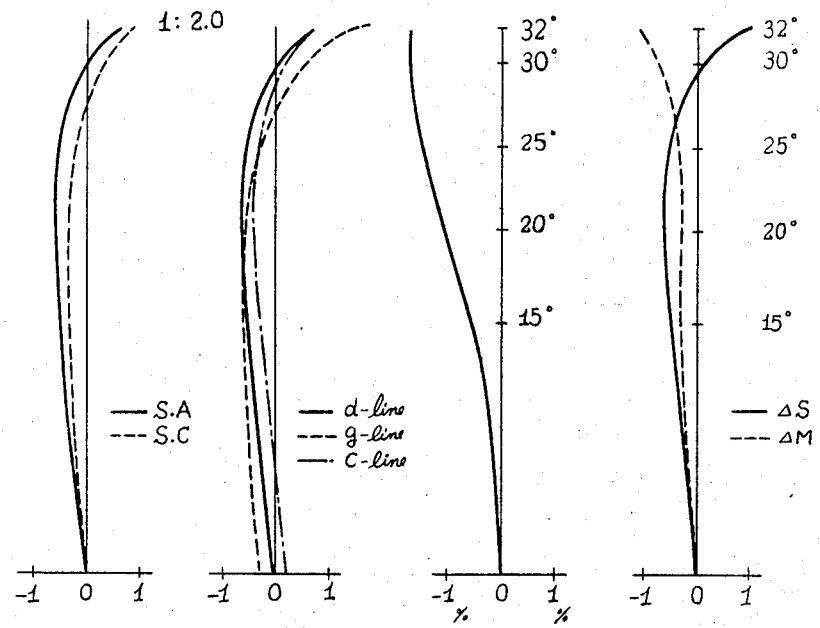
SPHERICAL ABERRATION (S.A)    CHROMATIC    DISTORTION    ASTIGMATISM
SINE CONDITION (S.C)           ABERRATION
INVENTOR
YASUO TAKAHASHI
BY Stanley Wolder
ATTORNEY 3,506,336
WIDE ANGLE LENS SYSTEM
Yasuo Takahashi, Itabashi-ku, Tokyo-to, Japan, assignor to Asahi Kogaku Kogyo Kabushiki Kaisha, Tokyo-to, Japan, a corporation of Japan
Filed Sept. 27, 1967, Ser. No. 671,069
Claims priority, application Japan, Sept. 30, 1966, 41/64,565
Int. Cl. G02b 9/64
U.S. Cl. 350—176                     1 Claim

ABSTRACT OF THE DISCLOSURE

A bright, wide angle lens system comprises eight lenses constituting seven groups, the first lens being negative, the second and third lenses being positive, the fourth lens being positive, or negative or powerless, the fifth and sixth lenses being negative, and the seventh and eighth lenses being positive. The first lens is of negative meniscus type with the surface of larger curvature directed to the image side; the fourth lens is positive, or negative, or powerless, with the convex surface directed to the object side; the fifth lens is of double concave type; and the sixth and the seventh lens are a cemented unit.

BACKGROUND OF THE INVENTION

The present invention relates generally to improvements in camera objective lens systems and it relates particularly to an improved camera wide angle objective lens system.

With the conventional bright retrofocus lens systems employed in cameras, the spacing between the front negative lens for retrofocus purpose and the rear lens group considered as the main lens system is relatively great. Therefore, according to such system, an objective of wide angle of field cannot be obtained unless a front negative lens of large size is employed.

SUMMARY OF THE INVENTION

A principal object of the present invention is to provide an improved lens system.

Another object of the present invention is to provide an improved camera wide angle objective lens system.

Still another object of the present invention is to provide an improved small-sized yet bright camera wide angle objective lens system.

The above and other objects of the present invention will become apparent from a reading of the following description taken in conjunction with the accompanying drawings which illustrate a preferred embodiment thereof.

In a sense the present invention contemplates the provision of a lens system comprising eight lenses herein consecutively designated from the front to the rear as the first to the eighth lens, the first lens being negative, the second and third lenses being positive, the fourth lens being positive, or negative or powerless, the fifth and sixth lenses being negative, and the seventh and eighth lenses being positive. The first lens is of negative meniscus type with the surface of larger curvature directed to the image side; the fourth lens is positive, or negative, or powerless, with the convex surface directed to the object side; the fifth lens is of double concave type; and the sixth and the seventh lenses are a cemented unit. The lens system satisfies the following conditions:

(1) $F/0.3 > |F_1| > F/0.9,\ F_1 < 0$
(2) $0.6F > t_1 > 0.3F$
(3) $\infty \geq r_4 > F$
(4) $4F > r_5 > 0.8F$
(5) $0.5F > d_2 + t_2 + d_3 > 0.2F$
(6) $F/0.7 > F_{1,2,3} > F/1.2$
(7) $F/0.2 > |F_{1,2,3,4,5}| > F/0.8,\ F_{1,2,3,4,5} < 0$
(8) $1.5F > r_{10} > 0.7F$
(9) $n_5 > 1.65$
(10) $0.12 \geq n_6 - n_7 \geq 0.01$
(11) $n_6,\ n_7,\ n_8 > 1.65$ wherein F is the resultant focal length of the entire lens system; $F_{1,2\ldots i}$ is the resultant focal length of the first to the $i$th lens; $r_j$ is the radius of curvature of the $j$th surface; $d_i$ is the thickness of the $i$th lens; $n_i$ is the index of refraction of the $i$th lens; and $t_k$ is the $k$th lens spacing.

Of the above conditions which characterize the present lens system, condition (1) in association with conditions (2), (6) and (7) functions to make the back focus longer and also to make the lens system small-sized; condition (2) in cooperation with condition (5) serves to make the size of the front negative lens smaller; conditions (3) and (4) in cooperation with condition (6) function to prevent negative increase in distortion aberration; condition (4) in close relation with condition (6) has a great influence upon correction of spherical aberration and serves to prevent aggravation of coma aberration with respect to incident rays making large positive angles with the optical axis in the range of large incidence point heights; condition (7) in association with condition (6) is necessary to make the back focus longer and further, in association with conditions (8) and (9), serves to prevent aggravation of coma aberration; condition (10) functions to prevent aggravation of coma aberration with respect to bundle of rays of relatively small incidence point heights and further, in association with condition (11), functions to prevent overcorrection of spherical aberration. If $n_6$ is large and $n_7$ is small, the surface $r_{13}$ or the subsequent lenses must cope with the overcorrection of spherical aberration at the surface $r_{12}$ so that remaining spherical aberration becomes very large. Similar disadvantage would result if $n_6$ is small under condition (10).

BRIEF DESCRIPTION OF THE DRAWINGS

FIGURE 1 is a longitudinal, sectional view of an objective lens system embodying the present invention; and FIGURE 2 is a set of aberration curves of the lens system of FIGURE 1 with the resultant focal length $F=100$.

DESCRIPTION OF THE PREFERRED EMBODIMENT

Referring now to the drawings and particularly FIGURE 1 thereof which illustrates a preferred embodiment of the present invention, the improved lens system comprises eight coaxially positioned lenses designated successively as lenses 1 to 8 respectively. The dimensions, relationships and parameters of lenses are such as to staisfy the conditions previously set forth.

Lens 1 is negative and of a thickness $d_1$ with a convex front face of radius of curvature $r_1$ and a concave rear face of radius of curvature $r_2$; lens 2 is positive and is spaced from lens 1 a distance $t_1$, is of a thickness $d_2$ and has a concave front face of radius of curvature $r_3$ and a convex rear face of radius of curvature $r_4$; lens 3 is positive and is spaced from lens 2 a distance $t_2$, is of a thickness $d_3$ and has a convex front face of radius of curvature $r_5$ and a convex rear face of radius of curvature $r_6$ and of lesser curvature than the front face; lens 4 is positive and is spaced from lens 3 a distance $t_3$, is of a thickness $d_4$ and has a convex front face of radius of curvature $r_7$ and a concave rear face of radius of curvature $r_8$; and lens 5 is negative and is spaced from lens 4 a distance $t_4$, is of a thickness $d_5$ and has a concave front face of radius of curvature $r_9$ and a concave rear face of radius of curvature $r_{10}$. Lenses 6 and 7 form a doublet with their confronting surfaces mating and cemented and defining a single lens face. Lens 6 is negative and is spaced from lens 5 a distance $t_5$ and is of a thickness $d_6$ with a convex front face of radius of curvature $r_{11}$ and a concave rear surface of radius of surface $r_{12}$ and lens 7 is positive and of a thickness $d_7$ with a convex front surface of radius of curvature $r_{12}$ and a convex rear face of radius of curvature $r_{13}$. Lens 8 is positive and is spaced from lens 7 a distance $t_7$ is of a thickness $d_8$, has a concave front face of radius of curvature $r_{14}$ and a convex rear face of radius of curvature $r_{15}$.

The following Table 1 sets forth the lens surfaces and radii of curvature, the lens spacings and thicknesses, and the refractive indices and Abbe values of a specific example of the present lens system related to the above described embodiment.

TABLE 1

| $r_1$ | 450.000 | $d_1$ | 7.00 | $n_1$ | 1.58913/61.2 |
|---|---|---|---|---|---|
| $r_2$ | 80.137 | $t_1$ | 47.00 | | |
| $r_3$ | −2,300.000 | $d_2$ | 10.00 | $n_2$ | 1.76200/40.3 |
| $r_4$ | −292.234 | $t_2$ | 2.00 | | |
| $r_5$ | 95.700 | $d_3$ | 18.00 | $n_3$ | 1.77252/49.6 |
| $r_6$ | −707.468 | $t_3$ | 1.00 | | |
| $r_7$ | 80.000 | $d_4$ | 8.00 | $n_4$ | 1.53172/48.9 |
| $r_8$ | 84.488 | $t_4$ | 18.00 | | |
| $r_9$ | −91.500 | $d_5$ | 6.50 | $n_5$ | 1.74077/27.7 |
| $r_{10}$ | 98.025 | $t_5$ | 8.00 | | |
| $r_{11}$ | 1,000.000 | $d_6$ | 4.00 | $n_6$ | 1.83400/37.2 |
| $r_{12}$ | 71.000 | $d_7$ | 19.00 | $n_7$ | 1.77252/49.6 |
| $r_{13}$ | −89.354 | $t_7$ | 0.50 | | |
| $r_{14}$ | −600.000 | $d_8$ | 10.00 | $n_8$ | 1.77252/49.6 |
| $r_{15}$ | −110.648 | | | | |

The following Table 2 sets forth the Seidel coefficients and their respective sums of the specific lens system of Table 1 which are determined with a diaphragm positioned between the fourth and the fifth lenses 4 and 5.

TABLE 2

| | $S_1$ | $S_2$ | $S_3$ | $S_4$ | $S_5$ |
|---|---|---|---|---|---|
| 1 | 0.002 | 0.009 | 0.038 | 0.082 | 0.465 |
| 2 | −2.195 | 0.109 | −0.005 | −0.462 | 0.023 |
| 3 | 0.148 | 0.180 | 0.218 | −0.018 | 0.242 |
| 4 | −0.002 | 0.014 | −0.076 | 0.147 | −0.379 |
| 5 | 2.017 | 0.547 | 0.148 | 0.455 | 0.163 |
| 6 | 0.942 | −0.817 | 0.709 | 0.061 | −0.669 |
| 7 | −0.084 | −0.097 | −0.112 | 0.433 | 0.371 |
| 8 | 0.037 | 0.091 | 0.220 | −0.410 | −0.459 |
| 9 | −3.755 | 1.568 | −0.654 | −0.465 | 0.467 |
| 10 | −1.186 | −0.997 | −0.839 | −0.434 | −1.070 |
| 11 | 0.134 | 0.254 | 0.480 | 0.045 | 0.995 |
| 12 | −0.330 | −0.187 | −0.106 | −0.026 | −0.075 |
| 13 | 1.530 | −0.393 | 0.101 | 0.487 | −0.151 |
| 14 | −0.116 | 0.149 | −0.190 | −0.072 | 0.335 |
| 15 | 3.569 | −0.368 | 0.037 | 0.393 | −0.044 |
| Sum | 0.711 | 0.062 | −0.030 | 0.217 | 0.214 |

An inspection of the aberration curves in FIGURE 2 illustrates the high degree of correction of the various aberrations in the specific example of the wide angle lens system according to the present invention.

What is claimed is:
1. A lens system comprising eight lenses successively designated as the first to the eighth lens, the sixth and seventh lenses being a cemented doublet with the mating confronting surfaces of said sixth and seventh lenses defining a single lens face and the lens faces being successively designated from the front face of the first lens as the first to the fifteenth lens face, said lenses possessing the following dimensions and relationships:

| $r_1$ | 450.000 | $d_1$ | 7.00 | $n_1$ | 1.58913/61.2 |
|---|---|---|---|---|---|
| $r_2$ | 80.137 | $t_1$ | 47.00 | | |
| $r_3$ | −2,300.000 | $d_2$ | 10.00 | $n_2$ | 1.76200/40.3 |
| $r_4$ | −292.234 | $t_2$ | 2.00 | | |
| $r_5$ | 95.700 | $d_3$ | 18.00 | $n_3$ | 1.77252/49.6 |
| $r_6$ | −707.468 | $t_3$ | 1.00 | | |
| $r_7$ | 80.000 | $d_4$ | 8.00 | $n_4$ | 1.53172/48.9 |
| $r_8$ | 84.488 | $t_4$ | 18.00 | | |
| $r_9$ | −91.500 | $d_5$ | 6.50 | $n_5$ | 1.74077/27.7 |
| $r_{10}$ | 98.025 | $t_5$ | 8.00 | | |
| $r_{11}$ | 1,000.000 | $d_6$ | 4.00 | $n_6$ | 1.83400/37.2 |
| $r_{12}$ | 71.000 | $d_7$ | 19.00 | $n_7$ | 1.77252/49.6 |
| $r_{13}$ | −89.354 | $t_7$ | 0.50 | | |
| $r_{14}$ | −600.000 | $d_8$ | 10.00 | $n_8$ | 1.77252/49.6 |
| $r_{15}$ | −110.648 | | | | | wherein $r_i$ is the radius of curvature of the $i$th lens face, $d_n$ is the thickness of the $n$th lens, $t_n$ is the axial spacing between the $n$th lens and the next successive lens, $n_n$ is the index of refraction of the $n$th lens, and the value following the slash is the Abbé number for the $n$th lens.

References Cited

UNITED STATES PATENTS 3,036,499   5/1962   Lautenbacher _____ 350—214

DAVID SCHONBERG, Primary Examiner
ALLEN OSTRAGER, Assistant Examiner

U.S. Cl. X.R.

350—214